3,167,515
PREPARATION OF ALKALI METAL
HYDROSULFITES
Alfred A. Hinckley, Beverly, and Robert C. Wade, Ipswich, Mass., assignors to Metal Hydrides Incorporated, Beverly, Mass., a corporation of Massachusetts
No Drawing. Filed July 31, 1961, Ser. No. 127,899
8 Claims. (Cl. 252—188)

The present invention relates to methods for preparing aqueous solutions of alkali metal hydrosulfite.

The alkali metal hydrosulfites, particularly sodium hydrosulfite, are used extensively for reducing vat dyes and in bleaching wood pulps. However, they are very unstable and are readily oxidized by air as illustrated by the equation:

$$Na_2S_2O_4 + H_2O + O_2 \rightarrow NaHSO_3 + NaHSO_4 \qquad (1)$$

Consequently, the hydrosulfites must be carefully packaged and stored to prevent this decomposition. It is generally used in aqueous solution. When added to water it often ignites spontaneously. During the act of dissolving the hydrosulfites in water considerable amounts are destroyed as illustrated by Equation 1 above. Generally, only about 80 percent of the hydrosulfite remains in solution after one minute contact with water. Thus, the act of dissolving the hydrosulfites in water to render them available for commercial use results in large losses. Under commercial conditions of use, the aqueous solutions of the hydrosulfites are subjected to oxidizing conditions and, consequently, large excesses are required. Thus, in the reduction of vat dyes excesses of hydrosulfite of as much as 5 to 40 fold over the stoichiometric requirement are common.

We have discovered that substantially quantitative yields of alkali metal hydrosulfite can be obtained by dissolving in water a solid mixture of an alkali metal borohydride and an alkali metal metabisulfite containing not less than 1.3 moles of alkali metal borohydride to each 4 moles of alkali metal metabisulfite if the pH of the solution is maintained at about 10 or greater. If desired, an alkali metal hydroxide may be added to the above mixture of alkali metal borohydride and alkali metal metabisulfite in amount such that an aqueous solution formed by dissolving the mixture in water has a pH of not less than about 10. As alkali metal metabisulfite we prefer to employ either sodium or potassium metabisulfite. The preferred alkali metal borohydrides are sodium borohydride and potassium borohydride. The preferred alkali metal hydroxides are sodium and potassium hydroxide. Thus, the invention provides compositions of matter which not only are stable for storage purposes but can be dissolved in water to prepare aqueous solutions of alkali metal hydrosulfite to obtain substantially higher yields than has been possible prior to the present invention.

In place of the alkali metal metabisulfites the alkali metal bisulfites may be used. However, such mixtures are not sufficiently stable to permit storage for any prolonged period. Consequently, we prefer solid mixtures of alkali metal metabisulfites with alkali metal borohydrides.

The present invention also provides an alternative method for preparing alkali metal hydrosulfites in aqueous solution. In accordance with this method an alkali metal metabisulfite or an alkali metal bisulfite is dissolved at room temperature in an aqueous alkaline solution of an alkali metal borohydride having a pH of not less than about 10, the amount of borohydride used being not less than 1.3 moles for each four moles of the metabisulfite.

The invention is illustrated further by the results of a series of runs as indicated in the following Table I. In each of these runs sodium metabisulfite and the indicated borohydride were mixed in the molar proportions shown in the table. Ten grams of the mixture were dissolved in 500 cc. of water to which 3 cc. of a 1 normal aqueous solution of sodium hydroxide had previously been added to adjust its pH to 11. The pH was maintained at 11 by adding additional sodium hydroxide as required. The yield of hydrosulfite was determined by the standard analysis described in the text "Reagent Chemicals and Standards" (3rd edition), by Joseph Rosin.

Table I

| Molar Ratio of Bisulfite to Borohydride | Borohydride | Yield in Percent of Hydrosulfite |
|---|---|---|
| 4 to 1.25 | $NaBH_4$ | 93.0 |
| 4 to 1.3 | $NaBH_4$ | 97.6 |
| 4 to 1.4 | $NaBH_4$ | 98.0 |
| 4 to 1.75 | $NaBH_4$ | 100.0 |
| 4 to 2.0 | $NaBH_4$ | 100.0 |
| 4 to 2.0 | $KBH_4$ | 100.0 |
| 4 to 1.0 | $KBH_4$ | 73.8 |
| 4 to 1.0 | $NaBH_4$ | 75.6 |

The following Table II shows the results of a series of runs made using a mixture of sodium hydrosulfite and sodium borohydride in the molar proportions indicated in the table. In these runs the same procedure was used as in the runs illustrated in Table I. The results of the runs indicated in Table II illustrates that when a mixture of sodium hydrosulfite and sodium borohydride is dissolved in water, the yield of hydrosulfite is not substantially greater than the yields obtained by dissolving hydrosulfite alone in water.

Table II

| Molar Ratio of Hydrosulfite to Borohydride | pH | Yield in Percent of Hydrosulfite |
|---|---|---|
| 4 to 1 | 10 | 90.5 |
| 4 to 1 | 11 | 90.5 |
| 4 to 1 | 12 | 87.0 |
| 4 to 2 | 11.5 | 89.5 |
| 5.75 to 1 | 12.6 | 90.0 |

We claim:

1. A composition consisting essentially of a mixture of an alkali metal borohydride and an alkali metal metabisulfite in the proportions of between about 1.3 to 2 moles of said borohydride to each 4 moles of said metabisulfite.

2. A composition as claimed by claim 1 which also includes an alkali metal hydroxide in amount such that an aqueous solution formed by dissolving the composition in water has a pH of not less than about 10.

3. A composition as claimed by claim 1 wherein said alkali metal borohydride is sodium borohydride.

4. A composition as claimed by claim 1 wherein said alkali metal borohydride is potassium borohydride.

5. A composition as claimed by claim 2 wherein said alkali metal borohydride is sodium borohydride.

6. A composition as claimed by claim 2 wherein said alkali metal borohydride is potassium borohydride.

7. A composition as claimed by claim 5 wherein said alkali metal hydroxide is sodium hydroxide.

8. A composition as claimed by claim 6 wherein said alkali metal hydroxide is potassium hydroxide.

References Cited in the file of this patent
UNITED STATES PATENTS

| 1,270,150 | Gyzander | June 18, 1918 |
| 2,983,569 | Charle et al. | May 9, 1961 |
| 2,991,152 | Goerrig et al. | July 4, 1961 |
| 3,000,688 | Schubert et al. | Sept. 19, 1961 |
| 3,004,825 | Kamlet | Oct. 17, 1961 |

FOREIGN PATENTS

| 203,021 | Austria | Apr. 25, 1959 |